United States Patent
James et al.

(10) Patent No.: US 12,524,775 B2
(45) Date of Patent: Jan. 13, 2026

(54) IDENTIFYING AND PROCESSING MARKETING LEADS THAT IMPACT A SELLER'S ENTERPRISE VALUATION

(71) Applicant: HSIP Corporate Nevada Trust, Carson City, NV (US)

(72) Inventors: Joseph Plapprumbil James, Atlanta, GA (US); Sandeep Prabhakara, Piscataway, NJ (US); Hemant Butti, Atlanta, GA (US)

(73) Assignee: HSIP Corporate Nevada Trust, Carson City, NV (US)

( * ) Notice: Subject to any disclaimer, the term of this patent is extended or adjusted under 35 U.S.C. 154(b) by 0 days.

(21) Appl. No.: 17/432,738

(22) PCT Filed: Oct. 25, 2019

(86) PCT No.: PCT/US2019/058017
§ 371 (c)(1),
(2) Date: Aug. 20, 2021

(87) PCT Pub. No.: WO2020/171857
PCT Pub. Date: Aug. 27, 2020

(65) Prior Publication Data
US 2022/0138787 A1     May 5, 2022

Related U.S. Application Data

(63) Continuation-in-part of application No. 16/280,406, filed on Feb. 20, 2019, now Pat. No. 11,599,939.

(51) Int. Cl.
*G06Q 30/00* (2023.01)
*G06N 20/00* (2019.01)
(Continued)

(52) U.S. Cl.
CPC ......... *G06Q 30/0206* (2013.01); *G06N 20/20* (2019.01)

(58) Field of Classification Search
CPC .......................................... G06Q 10/00–50/00
(Continued)

(56) References Cited

U.S. PATENT DOCUMENTS

| 7,310,618 | B2 | 12/2007 | Libman |
| 7,653,592 | B1 | 1/2010 | Flaxman et al. |

(Continued)

FOREIGN PATENT DOCUMENTS

| WO | 2011/020076 A2 | 2/2011 |
| WO | WO 2020/171857 A1 | 8/2020 |

OTHER PUBLICATIONS

International Search Report & Written Opinion for PCT/US19/58017, dated Dec. 26, 2019.
(Continued)

*Primary Examiner* — Mustafa Iqbal
(74) *Attorney, Agent, or Firm* — Holder IP

(57) ABSTRACT

Systems, methods and computer readable media for automated marketing decisions based on company valuation results derived from ensemble machine learning models include collecting potential customer data for a set of potential customers from a lead source and transmitting the potential customer data to an optimization system. An ensemble machine learning model that establishes a transaction value for each of the set of potential customers based on an enterprise valuation of the seller. A marketing action is then taken. The marketing action may include one or more of budgeting for a transaction with the lead source, targeting communications to members of the set of potential custom- (Continued)

ers, accepting or rejecting members of the set of potential customers, or offloading members of the set of potential customers.

20 Claims, 8 Drawing Sheets

(51) Int. Cl.
*G06N 20/20* (2019.01)
*G06Q 30/0201* (2023.01)

(58) Field of Classification Search
USPC .............................................. 705/7.11–7.42
See application file for complete search history.

(56) References Cited

U.S. PATENT DOCUMENTS

| | | | |
|---|---|---|---|
| 7,778,885 B1 * | 8/2010 | Semprevivo | G06Q 30/02 |
| | | | 705/26.1 |
| 7,970,699 B1 * | 6/2011 | Bramlage | G06Q 40/02 |
| | | | 705/30 |
| 8,521,631 B2 | 8/2013 | Abrahams et al. | |
| 8,639,618 B2 | 1/2014 | Yan et al. | |
| 8,775,300 B2 | 7/2014 | Showalter | |
| 9,449,344 B2 | 9/2016 | Deshpande et al. | |
| 10,032,218 B1 | 7/2018 | Denbo | |
| 10,373,198 B1 * | 8/2019 | Cook | G06Q 40/03 |
| 2003/0033241 A1 | 2/2003 | Harari | |
| 2006/0059073 A1 | 3/2006 | Walzak | |
| 2007/0094060 A1 | 4/2007 | Apps et al. | |
| 2011/0161245 A1 | 6/2011 | Hollas | |
| 2011/0213730 A1 | 9/2011 | Carty et al. | |
| 2011/0270779 A1 | 11/2011 | Showalter | |
| 2011/0302000 A1 | 12/2011 | Dance et al. | |
| 2013/0138554 A1 | 5/2013 | Nikankin et al. | |
| 2013/0339217 A1 | 12/2013 | Breslow et al. | |
| 2015/0032598 A1 | 1/2015 | Fleming et al. | |
| 2015/0051957 A1 | 2/2015 | Griebeler et al. | |
| 2015/0170271 A1 | 6/2015 | Orloff et al. | |
| 2016/0171600 A1 | 6/2016 | Kay et al. | |
| 2017/0068977 A1 | 3/2017 | Mathur et al. | |
| 2017/0213280 A1 | 7/2017 | Kaznady | |
| 2018/0158139 A1 | 6/2018 | Krajicek et al. | |
| 2018/0253657 A1 | 9/2018 | Zhao et al. | |
| 2018/0253780 A1 | 9/2018 | Wang et al. | |
| 2018/0260891 A1 | 9/2018 | Merrill et al. | |
| 2018/0308159 A1 | 10/2018 | Knijnik et al. | |
| 2018/0322406 A1 * | 11/2018 | Merrill | G06N 20/20 |
| 2019/0019213 A1 | 1/2019 | Silberman et al. | |
| 2019/0073586 A1 | 3/2019 | Chen et al. | |
| 2019/0318421 A1 | 10/2019 | Lyonnet et al. | |
| 2019/0325524 A1 | 10/2019 | Gebara et al. | |
| 2019/0378050 A1 | 12/2019 | Edkin et al. | |
| 2019/0378210 A1 | 12/2019 | Merrill et al. | |
| 2020/0090003 A1 | 3/2020 | Marques et al. | |
| 2022/0036221 A1 | 2/2022 | Hargras et al. | |
| 2022/0405531 A1 * | 12/2022 | Stanton | G06N 20/20 |

OTHER PUBLICATIONS

J. Heaton; "An Empirical Analysis of Feature Engineering for Predictive Modeling"; SoutheastCon; 2016; 6 pages.
International Patent Application No. PCT/US2019/058017; Int'l Preliminary Report on Patentability; dated Sep. 2, 2021; 5 pages.

* cited by examiner

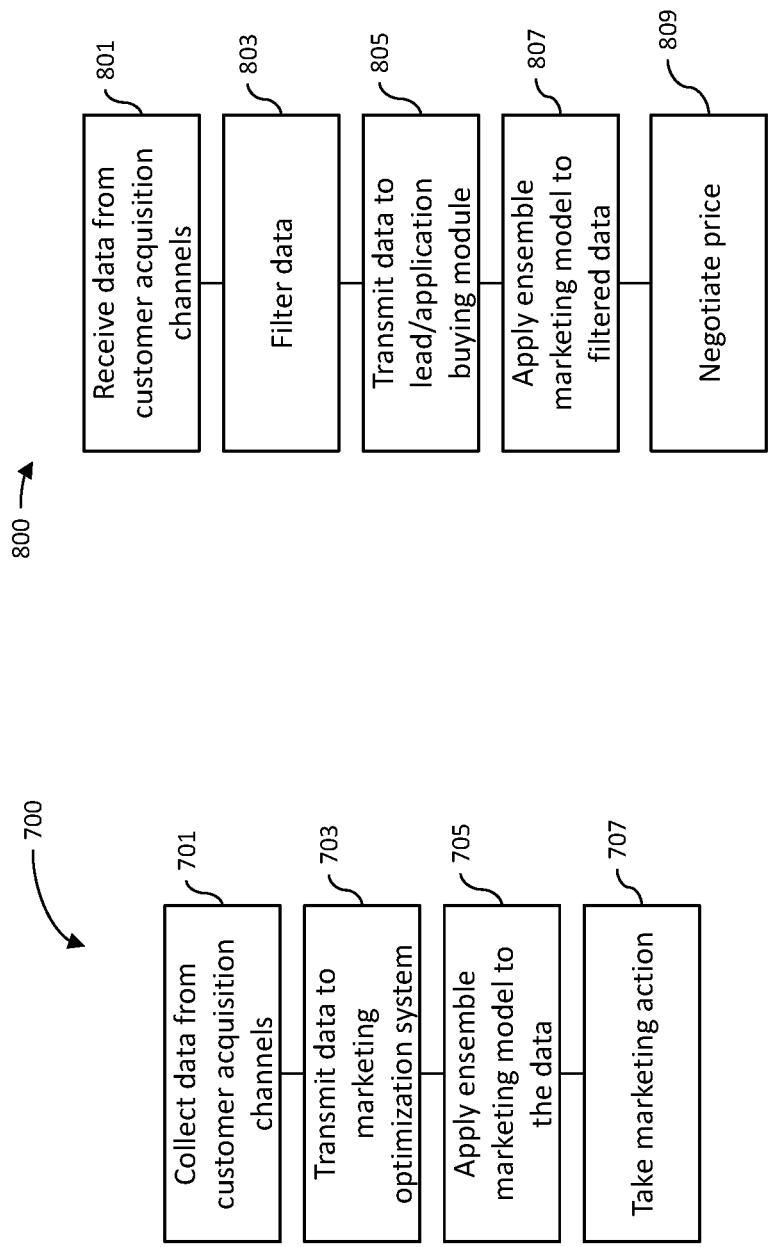

IDENTIFYING AND PROCESSING MARKETING LEADS THAT IMPACT A SELLER'S ENTERPRISE VALUATION

CROSS-REFERENCE TO RELATED APPLICATIONS

This application is a National Stage of International Patent Application No. PCT/US2019/058017, filed Oct. 25, 2019, which is a continuation-in-part of U.S. Utility application Ser. No. 16/280,406 titled SYSTEM, METHOD AND COMPUTER PROGRAM FOR UNDERWRITING AND PROCESSING OF LOANS USING MACHINE LEARNING, filed on Feb. 20, 2019, now U.S. Pat. No. 11,599,939, each of which is incorporated herein by reference in its entirety for any and all purposes.

TECHNICAL FIELD

The present disclosure relates to marketing systems. More particularly, the disclosure relates to methods, systems, and computer programs for automated marketing decisions based on company valuation results derived from ensemble machine learning models.

BACKGROUND

Businesses today have a variety of means to market their goods and services. These include search engine marketing, affiliate networks, lead providers, direct mail and display networks among others.

Search engine marketing is the practice of marketing a business using advertisements and Search Engine Optimization (SEO) that appear on search engine results pages (e.g. Google). Advertisers bid on keywords that potential customers might enter in a search engine when looking for goods or services. Ads appear alongside search results. The advantage of search engine marketing is that the ads are presented to customers who are ready to make a purchase.

In affiliate marketing a business compensates one or more affiliates for each visitor or customer brought by the affiliate's marketing efforts. In affiliate marketing a party earns a commission by promoting other people's (or company's) products. In affiliate marketing there are four parties that participate in the process: the advertiser/retailer; the network; the affiliate and the customer. In affiliate marketing there are a variety of compensation methods. These include revenue sharing, cost per action (where the advertiser pays for a specified action such as a sale, click, or a submitted form), cost per click (where the publisher is compensated when the ad is clicked) or cost per estimated 1000 views. Examples of affiliate networks include Rakuten, ShareASale, Awin, FlexOffers, MaxBounty, Clickbank, and Commission Junction.

Lead providers buy consumer information (leads) from lead creators and sell them to lead purchasers with leads matching their specification. Leads may be created in a number of ways. For example, a consumer who clicks an online advertisement may be redirected to a website containing a form to fill out. An advertisement may also allow a consumer to "click to call" a live salesperson. Online leads may also be created through consumer behavior online. For instance, a consumer may visit a shopping website and search for a product. A lead provider may then purchase the click data, combine it with personal contact information obtained from another source, and create a lead that can be followed-up on by the product retailer. Examples of Lead Providers include Zero Parallel.

Direct mail marketing is the creation and distribution of advertising materials through the mail. The direct mail will include contact information to enable the customer to contact the goods or service provider.

On a Display Network, businesses place display ads on a large network of sites across the internet. There are four primary display ad types:
  Responsive ads are text ads paired with a stock image, featuring a one-line header text and the marketer's URL.
  Gmail ads look like sponsored emails that show up towards the top of Gmail inboxes. When clicked on, some of them expand to a full-sized graphical HTML page.
  Banner ads are graphical ads that live on websites. This is the most popular display ad format.
  App ads are smaller mobile-focused banner ads within mobile apps.

In another example, search engines and advertising networks (e.g., Google) may run an auction every time there is an opportunity to show an advertiser's ads. Advertisers set their bid prices and Google determines which advertiser is willing to pay the most for the vacant ad spot. There are three pricing models available for advertisers, contingent on business goals.
  Cost-per-Click (CPC): Advertisers are only charged when someone clicks on an ad and visits the retailer's webpage.
  Cost-per-thousand Impressions (CPM): Advertisers pay per one thousand views. This is the best option for larger awareness campaigns.
  Cost-per-Acquisition (CPA): Advertisers pay per conversion on their site, whether it be an email signup or an online purchase.

These customer acquisition channels result in clicks connecting the customer with the retailer, calls from customers applications for customers and other inquiries. Currently, marketing is concerned with the qualities that make a potential customer convert to a sale. However, not all sales will have a positive impact on company valuation. There are currently limited ways of determining the value of a potential customer to the advertiser based on the potential impact of a contemplated transaction on the valuation of the advertiser.

There is a need to automate the processing of customer leads to identify the most valuable leads.

SUMMARY

One general aspect includes a method for marketing products by a seller by collecting potential customer data for a set of potential customers from a lead source and transmitting the potential customer data to a optimization system. The method then accesses an ensemble machine learning model that assesses a transaction value for each of the set of potential customers based on an enterprise valuation of the seller. Based on the transaction value a marketing action is taken. Other embodiments of this aspect include corresponding computer systems, apparatus, and computer programs recorded on one or more computer storage devices, each configured to perform the actions of the methods.

Implementations may include one or more of the following features. The method where the marketing action includes one or more of budgeting for a transaction with the lead source, targeting communications to members of the set of potential customers, accepting or rejecting members of the set of potential customers, or offloading members of the set of potential customers. The method where the marketing action includes accepting a subset of the set of potential customers based on the transaction value. The method where the ensemble machine learning model establishes the enterprise valuation of the seller based on factors including cost of customer acquisition, customer lifetime value, return on capital, percentage paid, and first payment default recovered. The method further including monetizing lead information of members of the set of potential customers that do not result in a transaction. The method where monetizing lead information of members of the set of potential customers that do not result in a transaction includes selling the lead information of members of the set of potential customers that do not result in a transaction to a third party. The method further including filtering the potential customer data to identify a subset of the set of potential customers that have a positive impact on the enterprise valuation of the seller. The method further including determining a price to be paid for a lead to a member of the subset of the set of potential customers based on lead quality, available lead volume and impact of the enterprise valuation of the seller. The method where the marketing action is to accept the lead and further including providing content to the lead. The method further including processing transactions with members of a subset of the set of potential customers and collecting transaction data including data of transactions of the members of the subset of the set of potential customers. The transaction data is the used to train the ensemble machine learning model. A machine learning module is used to validate the ensemble machine learning model. Implementations of the described techniques may include a system or computer software on a non-transitory computer-accessible medium.

One general aspect includes a system for marketing products by a seller including a processor; and machine-readable medium coupled to the processor, the machine-readable medium including processor implementation-specific instructions that, if executed by the processor, will cause the processor to perform certain operations. The operations include collecting potential customer data for a set of potential customers from a lead source. The operations also include transmitting the potential customer data to an optimization system. The operations also include accessing an ensemble machine learning model that assesses a transaction value for each of the set of potential customers based on an enterprise valuation of the seller. The system also includes taking a marketing action based on the transaction value.

Implementations may include one or more of the following features. The system where the marketing action includes one or more of budgeting for a transaction with the lead source, targeting communications to members of set of potential customers, or offloading members of the set of potential customers. The system where the marketing action includes accepting a subset of the set of potential customers based on the transaction value. The system where the ensemble machine learning model assesses the enterprise valuation of the seller based on factors including cost of customer acquisition, customer lifetime value, return on capital, percentage paid, and first payment default recovered. The system further including instructions that, if executed by the processor, will cause the processor to perform operations including monetizing lead information of members of the set of potential customers that do not result in a transaction. The system where monetizing lead information of members of the set of potential customers that do not result in a transaction includes selling the lead information of members of the set of potential customers that do not result in a transaction to a third party. The system further including instructions that, if executed by the processor, will cause the processor to perform operations including filtering the potential customer data to identify a subset of the set of potential customers that have a positive impact on the enterprise valuation of the seller. The system further including determining a price to be paid for a lead to a member of the subset of the set of potential customers based on lead quality, available lead volume and impact of the enterprise valuation of the seller. The system where the marketing action is to accept the lead and further including providing content to the lead. Implementations of the described techniques may include a method or process, or computer software on a non-transitory computer-accessible medium.

BRIEF DESCRIPTION OF THE DRAWINGS

FIG. 7 is a flow chart of a method for identifying and processing marketing leads that positively impact a seller's enterprise valuation using machine learning.

FIG. 8 is a flow chart of a method for price negotiation implemented by the optimization system.

DETAILED DESCRIPTION OF ILLUSTRATIVE EMBODIMENTS

Glossary

AUC. Area under the curve, when using normalized units, the area under the curve (often referred to as simply the AUC) is equal to the probability that a classifier will rank a randomly chosen positive instance higher than a randomly chosen negative one (assuming 'positive' ranks higher than 'negative').

Conversion funnel is a phrase used in e-commerce to describe the journey a consumer takes through an Internet advertising or search system, navigating an e-commerce website and finally converting to a sale.

GBM. Gradient boosting Machine (GBM) is a machine learning technique for regression and classification problems, which produces a prediction model in the form of an ensemble of weak prediction models, typically decision trees.

Lead quality is a factor that allows retailers to identify how likely prospects are to become paying customers. The higher the quality of the leads, the more likely that a potential customer become an actual customer. Exact measurements of lead quality may vary depending upon the lead generation strategy and the products or services that are sold.

Lead volume is the number of leads generated through acquisition sources.

Lead. In a sales context, a lead refers to contact with a potential customer, also known as a "prospect".

Logistic Regression. Logistic regression is a statistical model that in its basic form uses a logistic function to model a binary dependent variable.

Reinforcement Learning. Reinforcement Learning algorithms are used to train the machine to make specific decisions. The machine is exposed to an environment where it trains itself continually using trial and error. This machine learns from past experience and tries to capture the best possible knowledge to make accurate business decisions. (e.g. Markov Decision Process).

ROC. A receiver operating characteristic curve, or ROC curve, is a graphical plot that illustrates the diagnostic ability of a binary classifier system as its discrimination threshold is varied.

Supervised Learning. Supervised Learning algorithms consist of a target/outcome variable (or dependent variable) which is to be predicted from a given set of predictors (independent variables). Using these set of variables, a function is generated that maps inputs to desired outputs. The training process continues until the model achieves a desired level of accuracy on the training data. Examples of Supervised Learning include Regression, Decision Tree, Random Forest, KNN, Logistic Regression etc.

Unsupervised Learning. Unsupervised learning algorithms, do not have any target or outcome variable to predict/estimate. It is used for clustering population in different groups, which is widely used for segmenting customers in different groups for specific intervention. (e.g. Apriori algorithm, K-means).

Figure 1:
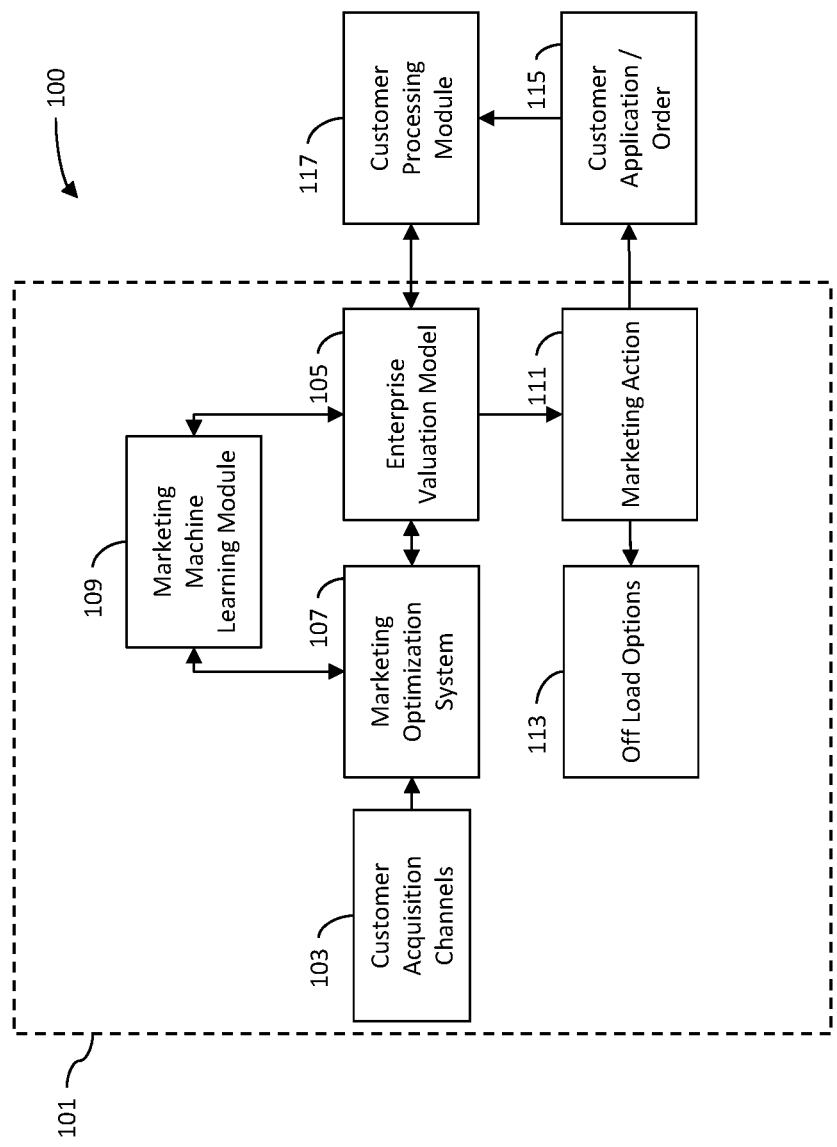
FIG. 1 is a block diagram illustrating a system for identifying and processing marketing leads that positively impact a seller's enterprise valuation using machine learning.

Illustrated in FIG. 1 is a system 100 for identifying and processing marketing leads that positively impact a seller's enterprise valuation. The system includes a lead processing system 101 including customer acquisition channels module 103, an enterprise valuation model 105, an optimization system 107, a machine learning module 109, a marketing action module 111 and an offload options module 113.

Figure 2:
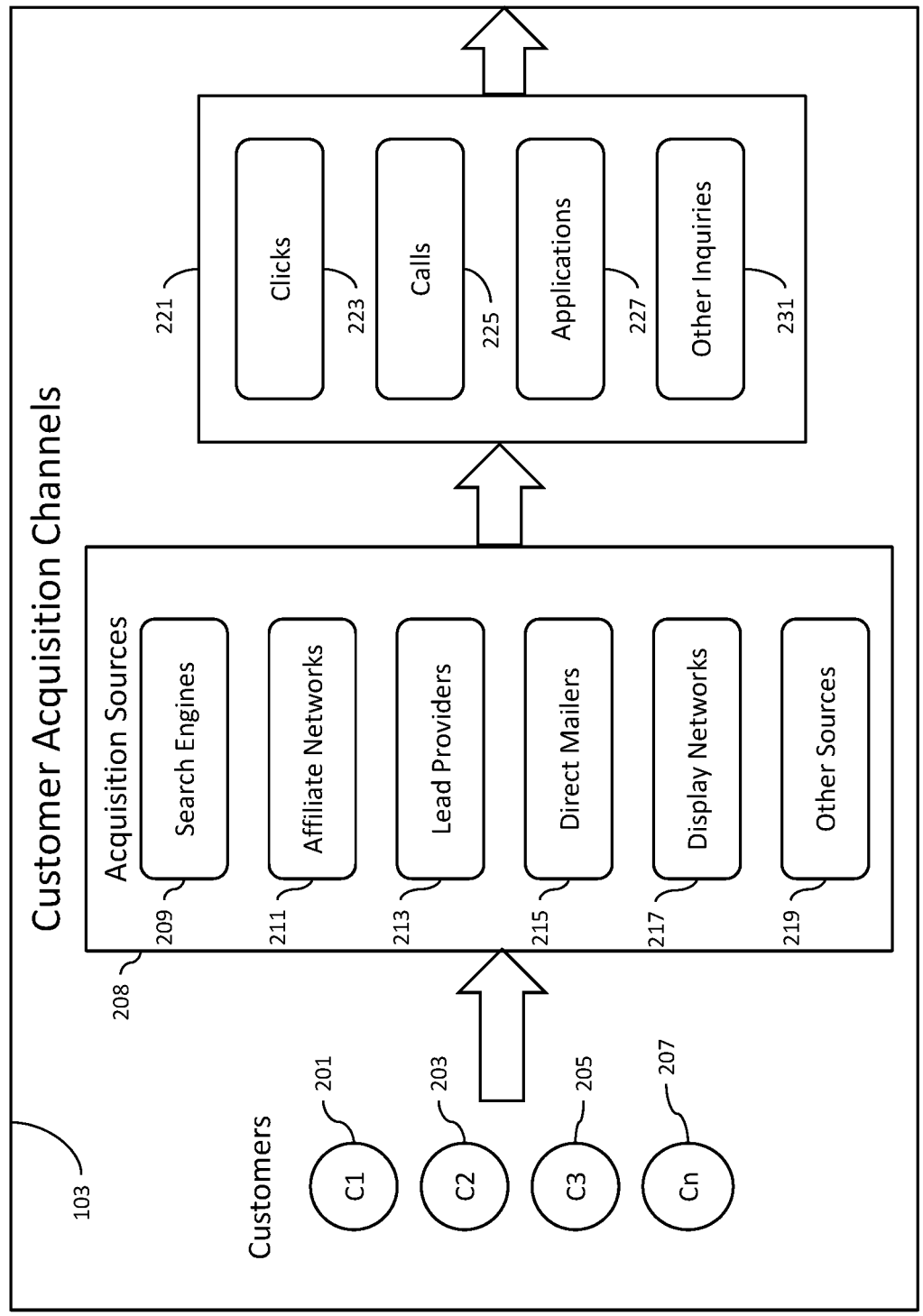
FIG. 2 is a block diagram illustrating customer acquisition channels.

As shown in FIG. 2, the customer acquisition channels module 103 may include a plurality of potential customers (e.g. customers C1 201, C2 203, C3 205 and Cn 207). The potential customers may access a variety of acquisition sources 208, including search engines 209, affiliate networks 211, lead providers 213, direct mailers 215, display networks 217 and other sources 219. The use of the acquisition sources 208 by the customers may result in customer actions 221 that include clicks 223, calls 225, applications 227 and other inquiries 231.

Figure 3:
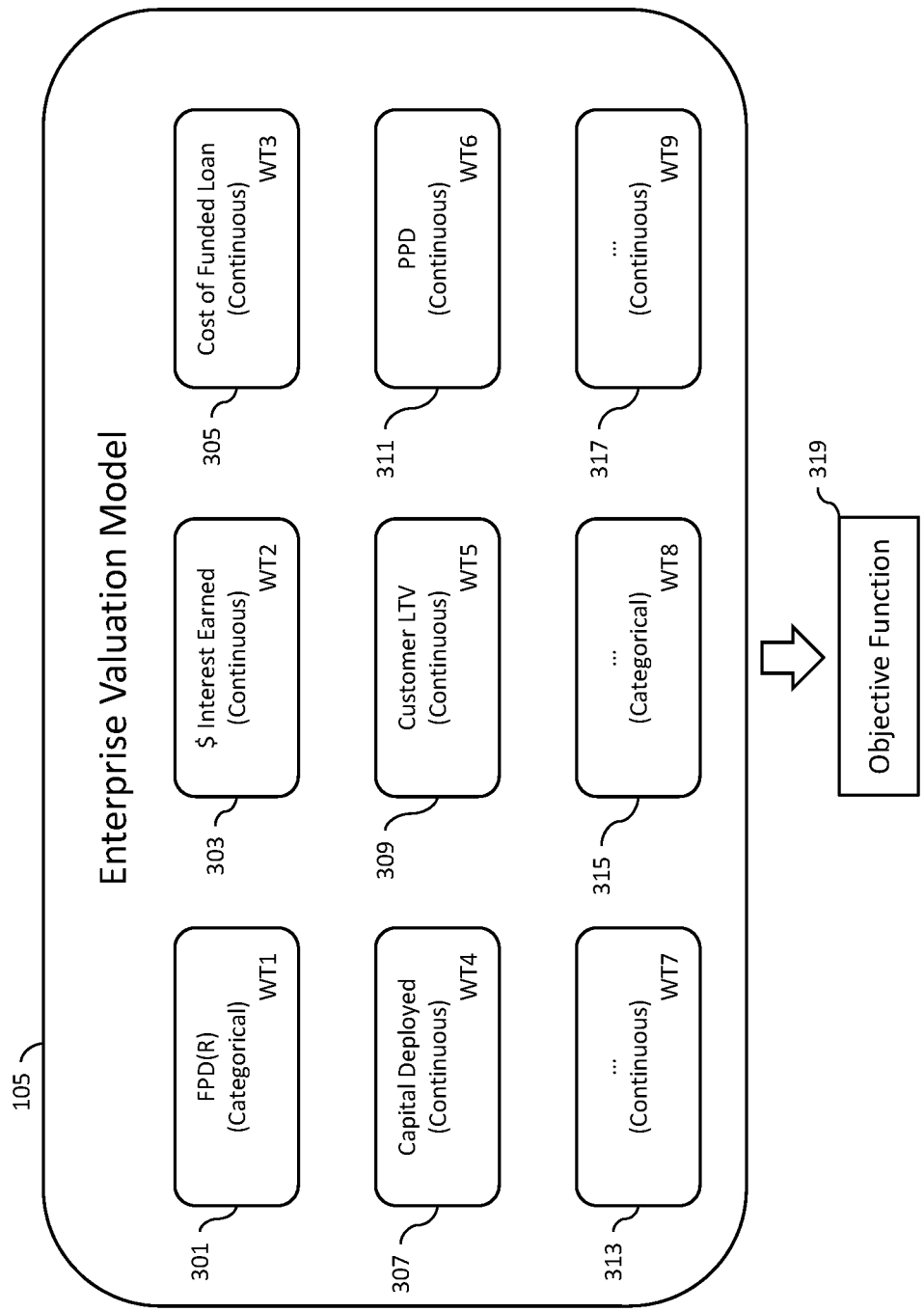
FIG. 3 is a block diagram illustrating an enterprise valuation model.

Illustrated in FIG. 3 is the enterprise valuation model 105. The enterprise valuation model 105 is comprised on a plurality of factors that are relevant to the contribution to enterprise value from a transaction with a customer. Some of these factors are categorical and others are continuous. Quantitative variables can be classified as categorical, discrete or continuous. Categorical variables contain a finite number of categories or distinct groups. Categorical data might not have a logical order. For example, categorical predictors include gender, payment method, etc. . . . Discrete variables are numeric variables that have a countable number of values between any two values. A discrete variable is always numeric. For example, the number of customer complaints or the number of flaws or defects. Continuous variables are numeric variables that have an infinite number of values between any two values. A continuous variable can be numeric or date/time. For example, the date and time a payment is received.

If the customer transaction involves a loan, the first payment default recovered (FDP(R) 301) would be a categorical factor relevant to the enterprise valuation. First payment default means, as of any date of determination after the effective date, the aggregate outstanding consumer loan principal balance of consumer loans sold by the lender to the borrower that experience a default in the first scheduled consumer loan payment. FPD(R) 301 is a feature indicating whether a first payment default has or has not been recovered. That factor may be given a weight WT1 which is proportional to the relevance of FDP(R) 301 to the enterprise valuation. The weight given to any factor is derived from machine learning algorithms. Another factor in a loan transaction may be the dollar amount of interest earned 303 which is a continuous factor that may be given a weight of WT2. Other factors may be the cost of funded loan 305, a continuous factor given a weight WT3, the capital deployed (a continuous factor given a weight WT4), the customer lifetime value (customer LTV 309) (a continuous factor given a weight WT5), the percentage paid (PPD 311) (a continuous factor given a weight WT5). Other continuous and categorical factors (e.g. continuous factor 313 with a weight WT7, categorical factor 315 with a weight WT8 and continuous factor 317 with a weight WT9) may be included. Although in this example nine factors are considered, it is contemplated that any number of factors may be relevant to enterprise valuation. All factors are combined into an objective function 319 the output of which is the impact of the transaction to the enterprise valuation.

Figure 4:
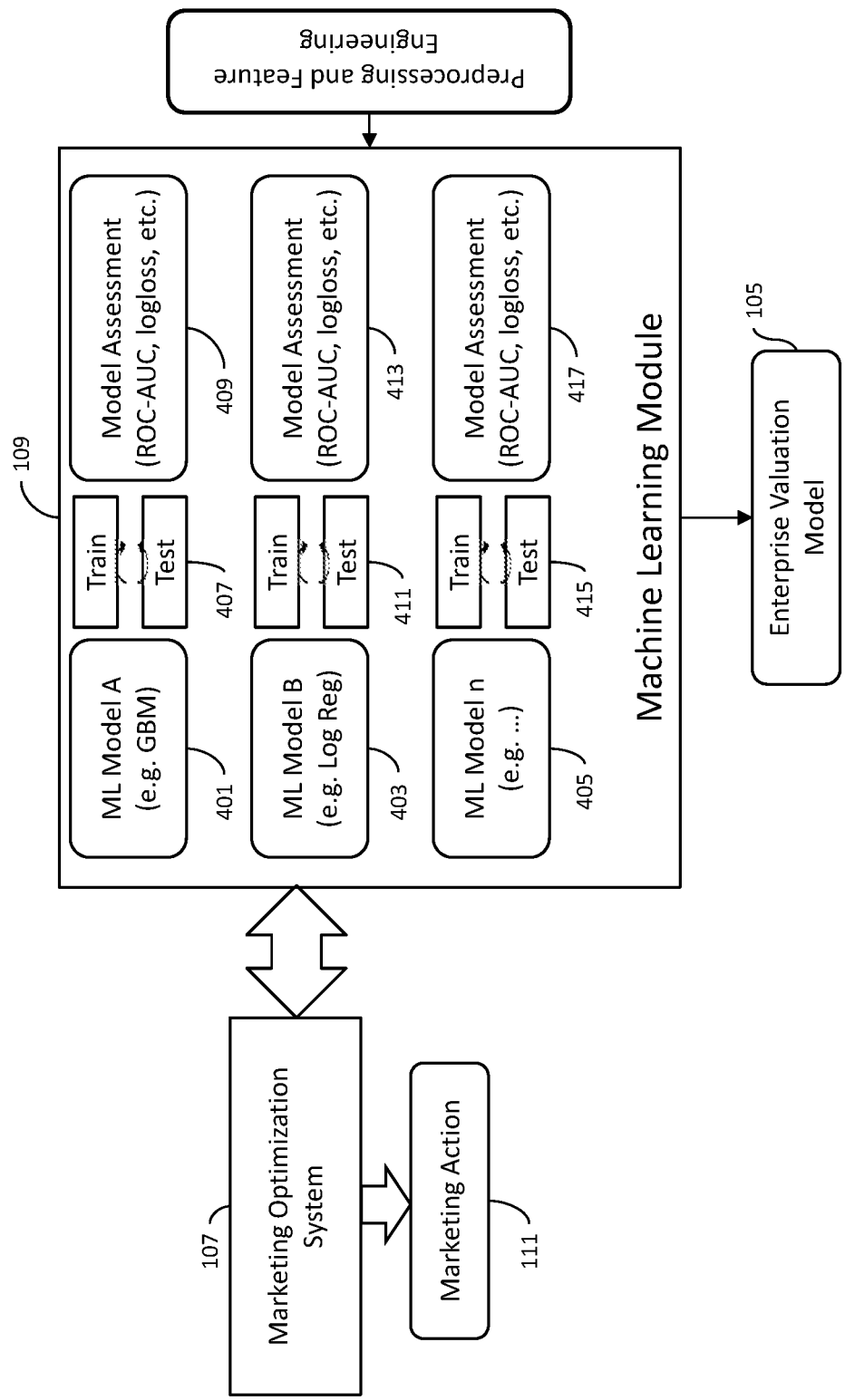
FIG. 4 is a block diagram illustrating a optimization system.

FIG. 4 illustrates a machine learning module 109, that interacts with the optimization system 107.

The relevance of the weighted features (Objective function 319) would be tested by the machine learning module 109 using machine learning models (e.g. ML model A 401, ML model B 403 and ML model n 405) implemented by the machine learning module 109. The results of such tests are used to train the machine learning module 109. For example, when input is received from preprocessing and feature engineering module 406 ML model A 401 may use a gradient boosting machine algorithm. Gradient boosting is a machine learning technique for regression and classification problems, which produces a prediction model in the form of an ensemble of weak prediction models, typically decision trees. It builds the model in a stage-wise fashion like other boosting methods do, and it generalizes them by allowing optimization of an arbitrary differentiable loss function. ML model B 403 may use a logistic regression algorithm. Logistic regression is a classification algorithm used to assign observations to a discrete set of classes. Unlike linear regression which outputs continuous number values, logistic regression transforms its output using the logistic sigmoid function to return a probability value which can then be mapped to two or more discrete classes. ML model n 405 may use other algorithms.

ML Model A 401, ML Model B 4013 and ML Model n 405 are combined to create an ensemble ML model. Ensemble learning helps improve machine learning results by combining several models. This approach allows the production of better predictive performance compared to a single model. Ensemble methods use a plurality of learning algorithms to optimize the predictive performance. A machine learning ensemble consists of a set of alternative models. Supervised learning algorithms perform the task of searching through a hypothesis space to find a suitable hypothesis that will make good predictions with a particular problem. Ensembles combine multiple hypotheses to form a better hypothesis.

Evaluating the prediction of an ensemble typically requires more computation than evaluating the prediction of a single model, so ensembles may be thought of as a way to compensate for poor learning algorithms by performing a lot of extra computation. Fast algorithms such as decision trees are commonly used in ensemble methods (for example, random forests), although slower algorithms can benefit from ensemble techniques as well.

Among the machine learning model types are supervised learning/predictive models; unsupervised learning/descriptive models; and reinforcement learning. Predictive models are used to predict the future outcome based on the historical data. Predictive models are normally given clear instructions right from the beginning as in what needs to be learnt and how it needs to be learnt. These class of learning algorithms are termed as Supervised Learning. Unsupervised learning is used to train descriptive models where no target is set and no single feature is considered more important than the other. Examples of algorithm that may be used include: K-means Clustering Algorithm. Reinforcement learning is an example of machine learning where the machine is trained to take specific decisions based on the business requirement with the sole objective of maximizing efficiency (performance). In reinforcement learning the machine/software agent trains itself on a continual basis based on the environment it is exposed to, and applies its enriched knowledge to solve business problems. This continual learning process ensures less involvement of human expertise which in turn saves a lot of time. An example of algorithm used in reinforcement learning is Markov Decision Process. Reinforcement learning involves learning by interacting with an environment. A reinforcement learning agent learns from its past experience, rather from its continual trial and error learning process as against supervised learning where an external supervisor provides examples.

FIG. 4 illustrates various examples of machine learning algorithms that may be used for both supervised and unsupervised learning. While specific examples are illustrated in FIG. 4, any appropriate machine learning algorithm, in light of the subject matter disclosed herein, may be used. For example, classification algorithms may include support vector machines, discriminant analysis, naive Bayes, and nearest neighbor algorithms that be used for supervised learning. Similarly, various regression algorithms such as linear regression, GLM, SVR, GPR, ensemble methods, decision trees, and neural networks may be used for supervised learning. For unsupervised learning, various clustering algorithms may be used such as K-means, K-medoids, fuzzy C-means, hierarchical, Gaussian mixture, neural networks, and hidden markov model, reinforcement learning algorithm—Q learning, etc.

To assess model performance, the data can be partitioned into a training set and a validation or test set. Training set used to construct the classifiers and the test set is used to assess their performance. Training and testing of ML model A 401 is accomplished using train/test module 407. Training and testing of ML model B 403 is accomplished using train/test module 411. Training and testing of ML model n 405 is accomplished using train/test module 415. The performance of each classifier on test set is used to obtain an unbiased estimator of the classifier's performance. If a number of classifiers are tested, then in the model selection stage the machine learning module 109 can choose the classifier that performed best on the test set. Performance may be determined by using a receiver operating characteristic curve that is created by plotting the true positive rate against the false positive rate at various threshold setting (e.g. Model Assessment 409, model assessment 413 and model assessment 417). Accuracy may be measured by the area under the receiver operating characteristic (ROC) curve, which measures accuracy of the model. Yet another testing approach is logarithmic loss that measures the performance of a classification model where the prediction input is a probability value between zero and one. The goal of the machine learning model is to minimize this value. A perfect model would have a log loss of zero.

The goal of the model training and testing is to create an ensemble machine learning model such as the enterprise valuation model 109. Ensemble models use multiple learning algorithms to obtain better predictive performance than could be obtained from any of the constituent learning algorithms alone. Unlike a statistical ensemble in statistical mechanics, which is usually infinite, a machine learning ensemble consists of only a concrete finite set of alternative models, but typically allows for much more flexible structure to exist among those alternatives. Ensemble learning helps improve machine learning results by combining several models. Ensemble methods are meta-algorithms that combine several machine learning techniques into one predictive model in order to decrease variance (bagging), bias (boosting), or improve predictions (stacking).

Figure 5:
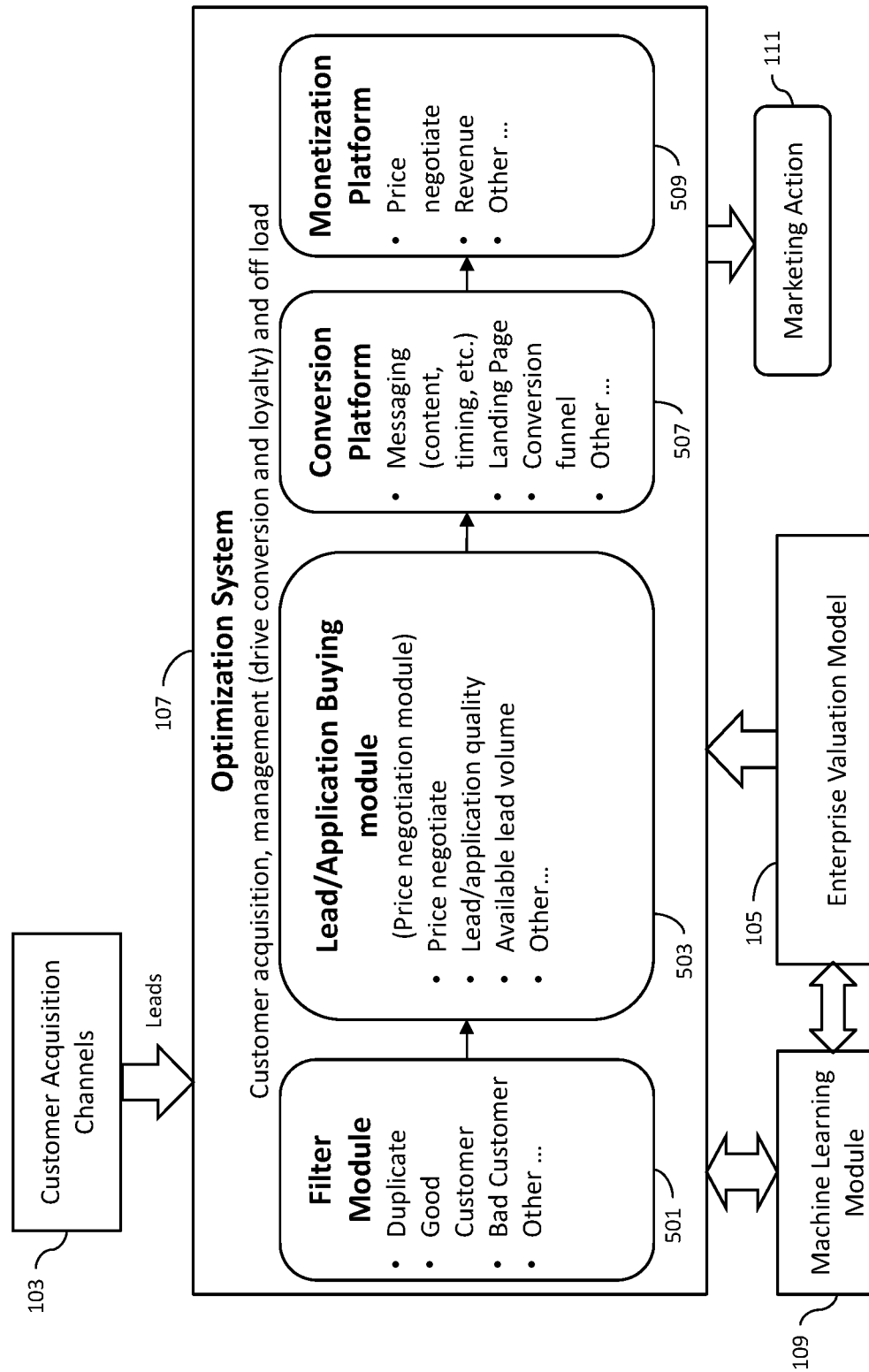
FIG. 5 is a block diagram illustrating a machine learning module

As shown in FIG. 5, leads from the customer acquisition channels 103 are provided to the optimization system 107. The optimization system 107 first processes the leads by applying a number of filters through a filter module 501. One filter may be whether the lead is a duplicate lead (e.g. in the case of an application, whether the same applicant applied previously). The duplicate lead filter may distinguish between the number of previous applications within a time period (e.g. the filter may distinguish between a duplicate application filed 2 hours previously or one that was filed three years previously, or a case where there were three applications made by the same potential customer within a thirty day period). Another filter may be whether the potential customer has a good payment history (good customer) or a bad payment history (bad customer). Other preliminary filters may be applied such as for example the value of the current transactions with the potential customer. The impact of the filtering criteria on the enterprise valuation is considered using the enterprise valuation model 105. So, for example, the good payment history of a potential customer may have a positive impact on the enterprise valuation and a bad payment history may have a negative impact on the enterprise valuation.

After the leads have been filtered the optimization system 107 processes the leads through a lead/application buying module 503. The lead/application buying module 503 determines the price to be paid for a lead or application. The price determination considers a number of factors such as lead/application quality (e.g. credit rating of potential customer, whether the potential customer has been a previous customer, the source of the lead, etc.), available lead volume, and any other relevant factor. The machine learning models help in determining the factors that drive the enterprise valuation model. The impact of these factors on the enterprise valuation are determined by the enterprise valuation model.

Once a lead/application has been purchased, a conversion platform 507 is accessed. The conversion platform 507 is a content platform that stores a collection of messages that to be sent to potential customers and the timing of when those messages are to be sent. The messages may include a landing page URL or other conversion methods for the potential customer. Conversion funnel is a phrase used in e-commerce to describe the journey a consumer takes through an Internet advertising or search system, navigating an e-commerce website and finally converting to a sale. Other messaging capabilities may be included in the conversion platform 507. Selection of the messages will be influenced by the enterprise valuation model 105.

If the lead is not converted into a transaction (e.g. a loan) then a monetization platform 509 is accessed to potentially sell the lead to a third party. Factors to be considered in the sale of the lead to a third party include the negotiated price, as well as the revenue to be generated by the sale of the lead. Other considerations may be assessed in making the determination of the sale of the lead. The determination of whether to sell the leads to a third party may be influenced by the enterprise valuation model 105.

The output of the optimization system is a marketing action 111.

Figure 6:
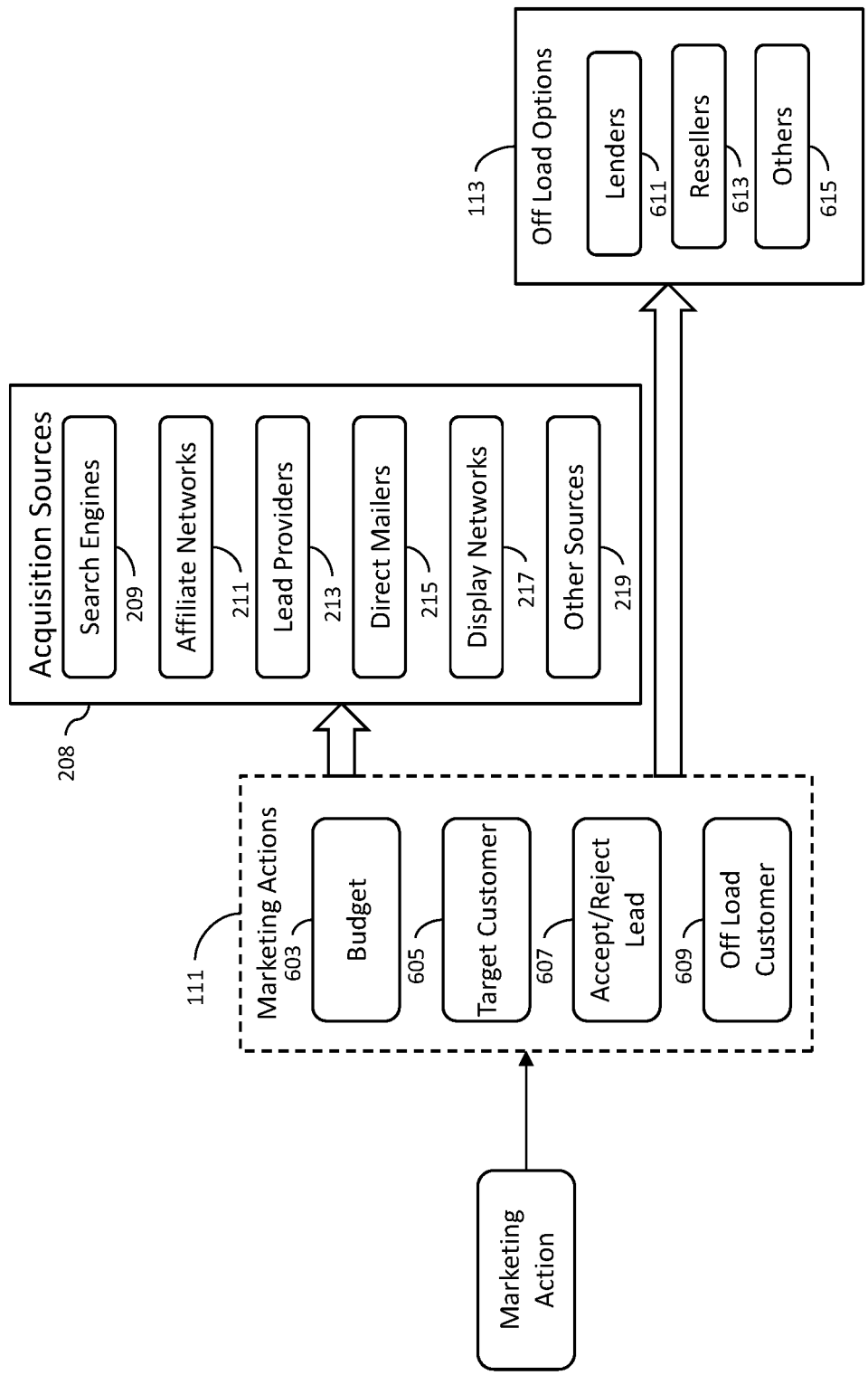
FIG. 6 is a block diagram illustrating the marketing actions of an optimization system.

Illustrated in FIG. 6 are the marketing actions 111 that may be implemented with various acquisition sources 208. The marketing actions may include the budgeting of financial resources for the acquisition of leads (budget 603), identification of a target customer (target customer 605), a determination of whether to accept or reject the lead (accept/reject lead 607), and a decision of whether to offload the potential customer (offload customer 609). If a determination is made to offload the potential customer the operator of the lead processing system 101 may select from options including offloading to other lenders 611, offloading to resellers 613, or offloading to others 615.

Illustrated in FIG. 7 is a flow chart of a method 700 for identifying and processing marketing leads that positively impact a seller's enterprise valuation using machine learning.

In step 701, the method 700 collects data from customer acquisition channels.

In step 703, the method 700 transmits the data to the optimization system.

In step 705, the method 700 applies an ensemble marketing model to the data.

In step 707, the method 700 takes a marketing action based on the application of the ensemble marketing model to the data.

Illustrated in FIG. 8 is a flow chart for a method 800 implemented by the optimization system 107.

In step 801 the optimization system 107 receives data from customer acquisition channels.

In step 803, they method 800 filters the data by applying filters such as whether the potential customer has previously been identified (e.g. duplicate), whether the customer is considered a good customer or a bad customer. Decisions on the filtering action may be based on input from the enterprise valuation model 105.

In step 805, the method 800 transmits the filtered data to delete/application buying module 403.

In step 807, the method 800 applies the ensemble marketing model to the filtered data to determine a negotiation price for the particular lead. Determination of the negotiation price may be based on the lead or application quality, the available lead volume, input from the enterprise valuation model 105 and other factors.

In step 809, the method 800 undertakes a marketing action which may include accepting or rejecting lead and negotiating a price for the lead.

Figures 9, 10:
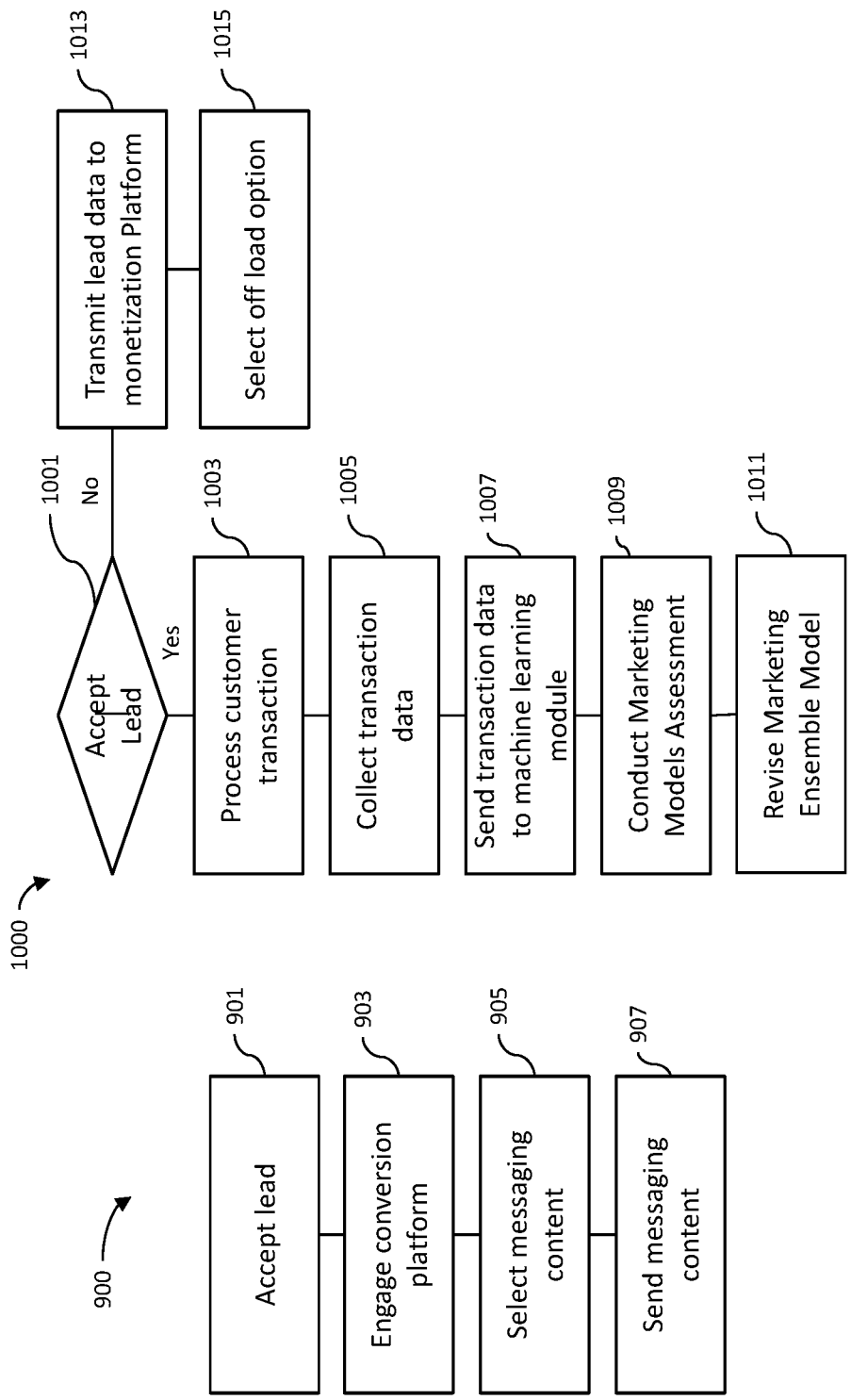
FIG. 9 is a flow chart for a method for selecting and transmitting messaging content.
FIG. 10 is a flow chart for a method for processing a lead after acceptance or rejection.

Illustrated in FIG. 9 is a flow chart for a method 904 for selecting and transmitting messaging content.

In step 901, method 900 undertakes the marketing action of accepting the lead.

In step 903, the method 900 engages conversion platform with messaging content.

In step 905, the method 900 selects the messaging content from available messaging content.

In step 907, the method 900 sense of messaging content to the potential customer.

Illustrated in FIG. 10 is a flow chart for a method 1000 illustrating what happens after a lead is accepted or rejected.

In step 1001, the method 1000 determines whether or not to accept the lead. The decision may be based on input from the enterprise valuation model 105.

If the lead is accepted, then in step 1003, the method 1000 processes the customer transaction.

In step 1005, the method 1000 collection transaction data.

In step 1007 to, the method 1000 sends the transaction data to the machine learning module.

In step 1009, the method 1000 conduction marketing model assessment and uses the transaction data to train the applicable machine learning model.

In step 1011, the method 1000 revises the marketing ensemble model in view of the transaction data.

If in step 1001 the lead is not accepted, then in step 1013, the method 1000 transmit the delete data to the monetization platform.

In step 1015, the method 1000 will select and offload option such as selling the lead to other lenders, resellers or others.

The marketing systems and methods of the present invention thus permit sellers to select potential customer leads based on the positive impact that a transaction with that potential customer lead will have on the seller's enterprise value.

Many modifications and other embodiments of the disclosure will come to mind to one skilled in the art to which this invention pertains having the benefit of the teachings presented in the foregoing descriptions and the associated drawings. Therefore, it is to be understood that the claims are not to be limited to the specific embodiments disclosed and that modifications and other embodiments are intended to be included within the scope of the claims. Although specific terms are employed herein, they are used in a generic and descriptive sense only and not for purposes of limitation.

What is claimed:

1. A computer implemented method, comprising:
   determining an objective function indicative of an impact of a transaction on an enterprise valuation, wherein the objective function is determined based on selecting a plurality of factors relevant to an enterprise and assigning to each factor a corresponding weight of a plurality of weights, wherein each assigned weight is indicative of the relevance of the corresponding factor to the enterprise valuation;
   training, based on the objective function and a training data set, an ensemble of machine learning models to determine an indication of the enterprise valuation, wherein the ensemble of machine learning models account for the plurality of factors relevant to the enterprise, wherein training the ensemble of machine learning models comprises performing an iterative process that iteratively adds one or more machine learning models to the ensemble of machine learning models by:

testing a plurality of machine learning models with a testing data set, wherein the testing data set comprises at least transaction data, determining an evaluation metric value for each of the plurality of machine learning models, and selecting, based on comparing the evaluation metric values to each other, a portion of the plurality of machine learning models that optimize the objective function, wherein the iterative process optimizes the ensemble to obtain a group of machine learning models of multiple different types of machine learning that collectively optimize the objective function;

receiving potential customer data for a potential customer associated with a lead source;

determining, based on inputting the potential customer data into the ensemble of machine learning models, an indication of the enterprise valuation, of the enterprise, associated with a potential transaction of the potential customer; and causing, based on transaction data associated with the potential customer, the ensemble of machine learning models to be updated.

2. The computer implemented method of claim 1, further comprising determining, based on the indication of the enterprise valuation, content, wherein the content comprises one or more messages from a collection of messages associated with a potential customer content data store.

3. The computer implemented method of claim 1, wherein the plurality of factors comprises one or more of a cost of customer acquisition, a customer lifetime value, a return on capital, a percentage paid, or a first payment default recovered.

4. The computer implemented method of claim 1, further comprising sending a communication associated with causing monetization of lead information of the potential customer if the potential transaction does not occur.

5. The computer implemented method of claim 4, wherein sending the communication associated with causing monetization of the lead information of the potential customer comprises sending a communication associated with causing sale of the lead information of the potential customer to a third party.

6. The computer implemented method of claim 1, further comprising applying the potential customer data to one or more filters configured to identify potential customers associated with a positive impact on the enterprise valuation of the enterprise.

7. The computer implemented method of claim 6, further comprising determining to accept the potential customer, and determining, based on available customer volume and the indication of the enterprise valuation associated with the potential customer, acceptance data associated with the potential customer.

8. The computer implemented method of claim 7, further comprising sending, to the lead source and based on determining to accept the potential customer, a message comprising acceptance data associated with the potential customer.

9. The computer implemented method of claim 1, further comprising:

processing a transaction of the potential customer; and determining the transaction data associated with the potential customer, wherein the transaction data is associated with the transaction.

10. The method of claim 1, wherein causing the ensemble of machine learning models to be updated comprises one or more of retraining the ensemble of machine learning models or generating one or more additional ensemble of machine learning models based on the prior trained ensemble of machine learning models.

11. The method of claim 1, wherein the iterative process comprises evaluating performance of a machine learning model both individually and as part of the ensemble of machine learning models.

12. The method of claim 1, further comprising:

causing an update to the objective function based on receiving data indicating a change to the objective function associated with changes in enterprise conditions; and causing, based on the update to the objective function, the ensemble of machine learning models to be updated.

13. A system comprising:

a processor;

a machine-readable medium coupled to the processor, the machine-readable medium including processor implementation-specific instructions that, if executed by the processor, will cause the processor to perform operations including:

determining an objective function indicative of an impact of a transaction on an enterprise valuation, wherein the objective function is determined based on selecting a plurality of factors relevant to an enterprise and assigning to each factor a corresponding weight of a plurality of weights, wherein each assigned weight is indicative of the relevance of the corresponding factor to the enterprise valuation;

training, based on the objective function and a training data set, an ensemble of machine learning models to determine an indication of the enterprise valuation, wherein the ensemble of machine learning models accounts for the plurality of factors relevant to the enterprise, wherein training the ensemble of machine learning models comprises performing an iterative process that iteratively adds one or more machine learning models to the ensemble of machine learning models by:

testing a plurality of machine learning models with a testing data set, wherein the testing data set comprises at least transaction data, determining an evaluation metric value for each of the plurality of machine learning models, and selecting, based on comparing the evaluation metric values to each other, a portion of the plurality of machine learning models that optimize the objective function, wherein the iterative process optimizes the ensemble to obtain a group of machine learning models of multiple different types of machine learning that collectively optimize the objective function;

receiving potential customer data for a potential customer associated with a lead source;

determining, based on inputting the potential customer data into the ensemble of machine learning models, an indication of the enterprise valuation, of the enterprise, associated with a potential transaction of the potential customer; and causing, based on transaction data associated with the potential customer, the ensemble of machine learning models to be updated.

14. The system of claim 13, further comprising instructions that, if executed by the processor, will cause the processor to perform operations including determining, based on the indication of the enterprise valuation, content, wherein the content comprises one or more messages from a collection of messages associated with a potential customer content data store.

15. The system of claim 13, wherein the plurality of factors comprise one or more of a cost of customer acquisition, a customer lifetime value, a return on capital, percentage paid, or a first payment default recovered.

16. The system of claim 13, further comprising instructions that, if executed by the processor, will cause the processor to perform operations including sending a communication associated with causing monetization of lead information of the potential customer if the potential transaction does not occur.

17. The system of claim 13, further comprising instructions that, if executed by the processor, will cause the processor to perform operations including applying the potential customer data to one or more filters configured to identify potential customers associated with a positive impact on the enterprise valuation.

18. The system of claim 17, further comprising instructions that, if executed by the processor, will cause the processor to perform operations including determining to accept the potential customer, and determining, based on available customer volume and the indication of the enterprise valuation associated with the potential customer, acceptance data associated with the potential customer.

19. The system of claim 18, further comprising instructions that, if executed by the processor, will cause the processor to perform operations including sending, to the lead source and based on determining to accept the potential customer, a message comprising acceptance data associated with the potential customer.

20. The system of claim 13, further comprising instructions that, if executed by the processor, will cause the processor to perform operations including:

processing a transaction of the potential customer; and determining the transaction data associated with the potential customer, wherein the transaction data is associated with the transaction.

\* \* \* \* \*